United States Patent
Elton et al.

(10) Patent No.: US 9,802,570 B1
(45) Date of Patent: Oct. 31, 2017

(54) MOVABLE BUCKLE MOUNTING SYSTEM

(71) Applicants: Robert Elton, Ann Arbor, MI (US); Steven J Schenten, Oxford, MI (US)

(72) Inventors: Robert Elton, Ann Arbor, MI (US); Steven J Schenten, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/259,860

(22) Filed: Sep. 8, 2016

(51) Int. Cl.
*B60R 22/22* (2006.01)
*B60R 22/20* (2006.01)
*B60N 2/04* (2006.01)

(52) U.S. Cl.
CPC ............ *B60R 22/201* (2013.01); *B60N 2/045* (2013.01); *B60R 22/22* (2013.01)

(58) Field of Classification Search
CPC ........ B60R 22/22; B60R 22/201; B60N 2/045
USPC ............................................ 297/473, 344.11
See application file for complete search history.

(56) References Cited

U.S. PATENT DOCUMENTS

| | | | |
|---|---|---|---|
| 4,964,608 A | 10/1990 | Rogala et al. | |
| 5,031,961 A | 7/1991 | Isern | |
| 5,064,220 A * | 11/1991 | Ogawa | B60R 22/26 180/268 |
| 5,236,220 A * | 8/1993 | Mills | B60R 22/22 280/801.1 |
| 5,322,348 A | 6/1994 | Johnson | |
| 5,332,261 A * | 7/1994 | Siepierski | B60R 22/22 280/801.1 |
| 7,229,117 B2 | 6/2007 | Okuda et al. | |
| 7,407,193 B2 * | 8/2008 | Yamaguchi | B60R 22/03 280/801.1 |
| 7,527,296 B2 | 5/2009 | Kojima et al. | |
| 7,644,952 B2 | 1/2010 | Holtz et al. | |
| 8,157,292 B2 * | 4/2012 | You | B60N 2/688 280/801.1 |
| 8,215,711 B2 * | 7/2012 | Fukuda | B60N 2/0705 248/429 |
| 8,439,448 B2 * | 5/2013 | Murthy | B60N 2/065 297/468 |
| 8,708,299 B2 | 4/2014 | Kitamura et al. | |
| 2002/0043872 A1 | 4/2002 | Townsend et al. | |
| 2015/0217720 A1 * | 8/2015 | Palaniappan | B60R 22/18 280/804 |

* cited by examiner

*Primary Examiner* — Faye M Fleming
(74) *Attorney, Agent, or Firm* — Ralph E Smith

(57) ABSTRACT

An adjustable occupant restraint system for a vehicle includes a floor bracket configured to couple to a vehicle floor, a link system rotatably coupled to the floor bracket, and a seat belt buckle coupled to the link system. The link system rotates in response to and along with the fore/aft adjustment of the vehicle seat to substantially maintain the seat belt buckle at a hip point of a seat occupant throughout the fore/aft adjustment of the vehicle seat.

16 Claims, 5 Drawing Sheets

MOVABLE BUCKLE MOUNTING SYSTEM

FIELD

The present application relates generally to vehicle occupant restraint systems and, more particularly, to an adjustable occupant restraint system for a movable vehicle seat.

BACKGROUND

Current vehicle regulations require that automobiles be equipped with occupant protection systems. One typical occupant protection system is a seat belt which physically restrains the occupant during a potential impact or deceleration event. In order to accommodate various sizes and shapes of occupants, seats of motor vehicles are provided with a fore-and-aft adjustment mechanism to enable the occupant to position themselves a desired distance from the vehicle instrument panel or other object in the vehicle, such as a forward seatback. In known systems, anchorages for the seat belts are fastened to the vehicle floor proximate the outboard sides of the seat. When the seat position is adjusted, the seat belt becomes tightened or loosened around the occupant, requiring it to also be readjusted. Mounting the seat belt anchorages to a movable portion of the seat may avoids this situation, however, such designs impose cost and weight penalties since the adjuster must be designed to withstand more extreme mechanical loads. Accordingly, while such systems work well for their intended purpose, it is desirable to provide an improved seating system.

SUMMARY

In one exemplary aspect of the invention, an adjustable occupant restraint system for a vehicle is provided. The system includes a floor bracket configured to couple to a vehicle floor, a link system rotatably coupled to the floor bracket, and a seat belt buckle coupled to the link system. The link system rotates in response to and along with the fore/aft adjustment of the vehicle seat to substantially maintain the seat belt buckle at a hip point of a seat occupant throughout the fore/aft adjustment of the vehicle seat.

In another exemplary aspect of the invention, a vehicle is provided. The vehicle includes a floor, a seat slidably coupled to the floor and adjustable in fore/aft directions, and an adjustable occupant restraint system for the seat. The restraint system includes a floor bracket configured to couple to the floor, a link system rotatably coupled to the floor bracket, and a seat belt buckle coupled to the link system. The link system rotates in response to and along with the fore/aft adjustment of the vehicle seat to substantially maintain the seat belt buckle at a hip point of a seat occupant throughout the fore/aft adjustment of the vehicle seat.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Figure 1:
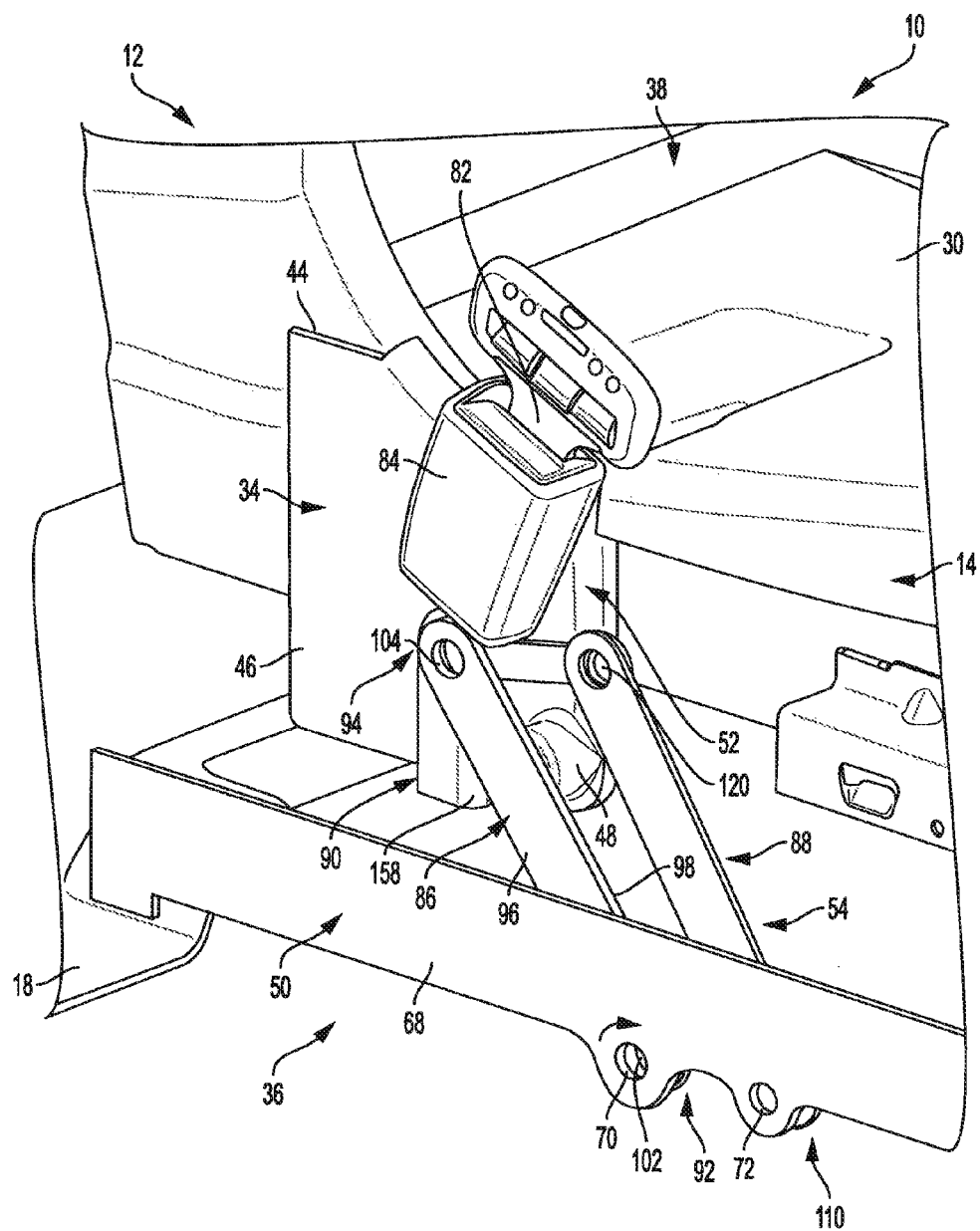
FIG. 1 is a perspective view of an example vehicle seat and adjustable occupant restraint system in accordance with the principles of the present disclosure.
Figure 2:
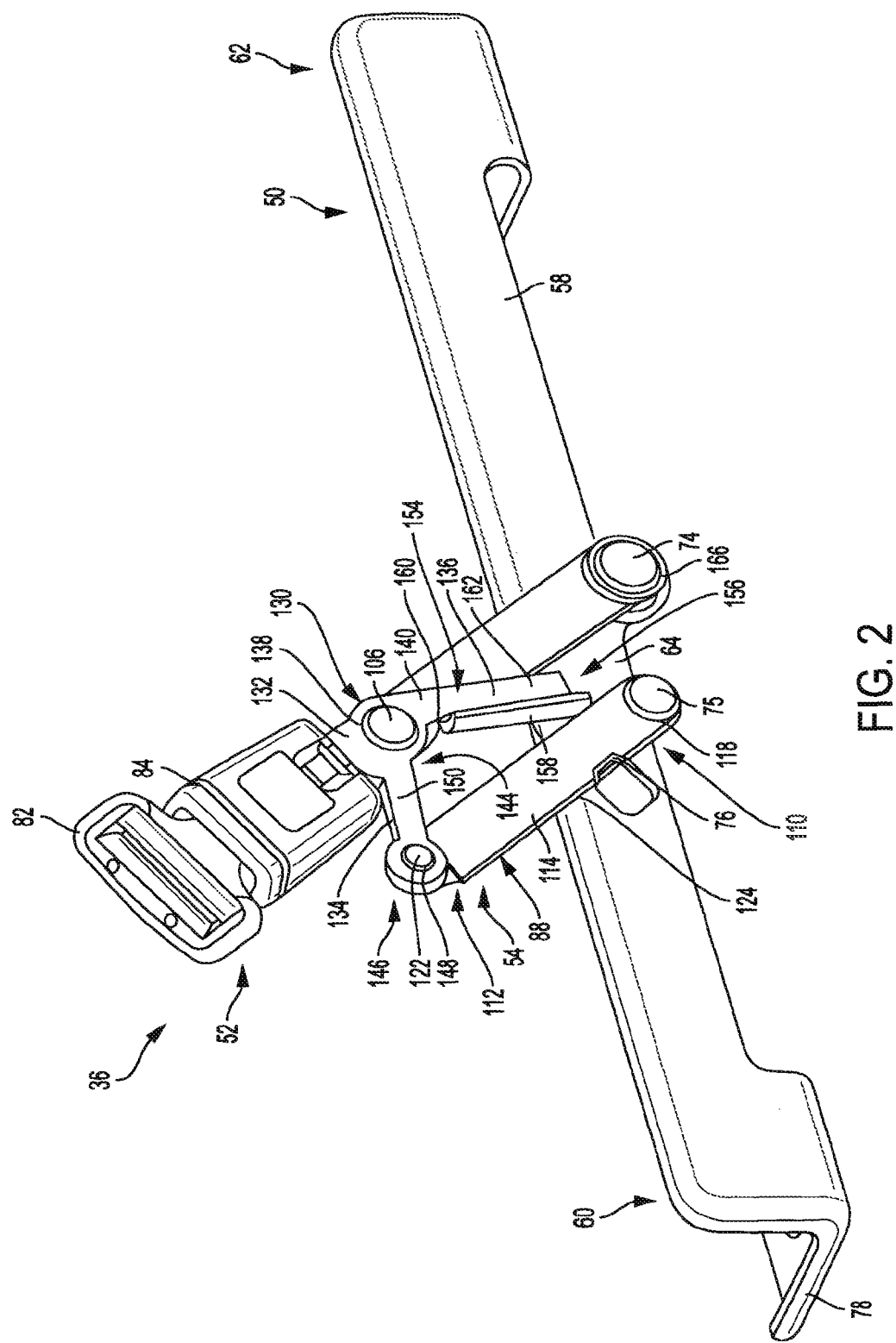
FIG. 2 is a front perspective view of the adjustable occupant restraint system shown in FIG. 1 in accordance with the principles of the present disclosure.
Figure 3:
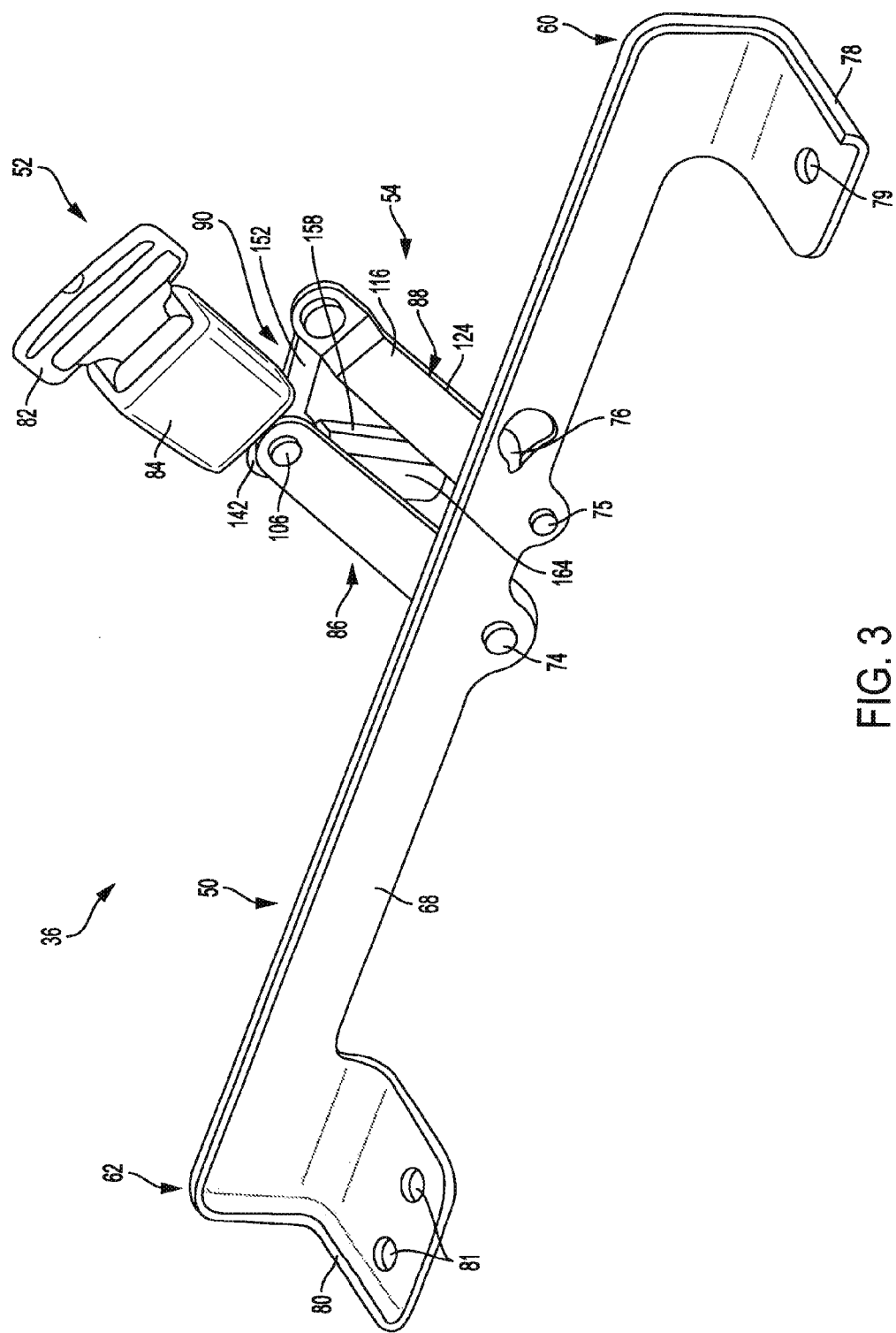
FIG. 3 is a rear perspective view of the adjustable occupant restraint system shown in FIG. 2 in accordance with the principles of the present disclosure.

With reference to FIGS. 1-3, a vehicle interior 10 having an example movable vehicle seat system 12 according to various aspects of the present disclosure is illustrated. Movable seat system 12 generally includes a vehicle seat 14 movably coupled to a track or rail system (not shown) that is integrated with a floor 18 of the vehicle interior 10. In the example implementation, vehicle seat 14 generally includes a seat bottom 30, a seat back 32, a trim cover 34, and a movable or adjustable occupant restraint system 36.

The adjustable occupant restraint system 36 is configured to hold a seat belt buckle for a seat occupant in a proper position when the seat is adjusted or moved throughout a full range of fore/aft adjustments as well as an easy entry position (e.g., to allow ingress/egress to a rear seating area). The seat belt buckle is mounted to a four-bar linkage that enables the seat belt buckle to travel with the vehicle seat through the range of seated positions while maintaining or substantially maintaining the seat belt buckle aimed at the occupant hip point to facilitate proper operation thereof.

Figure 6:
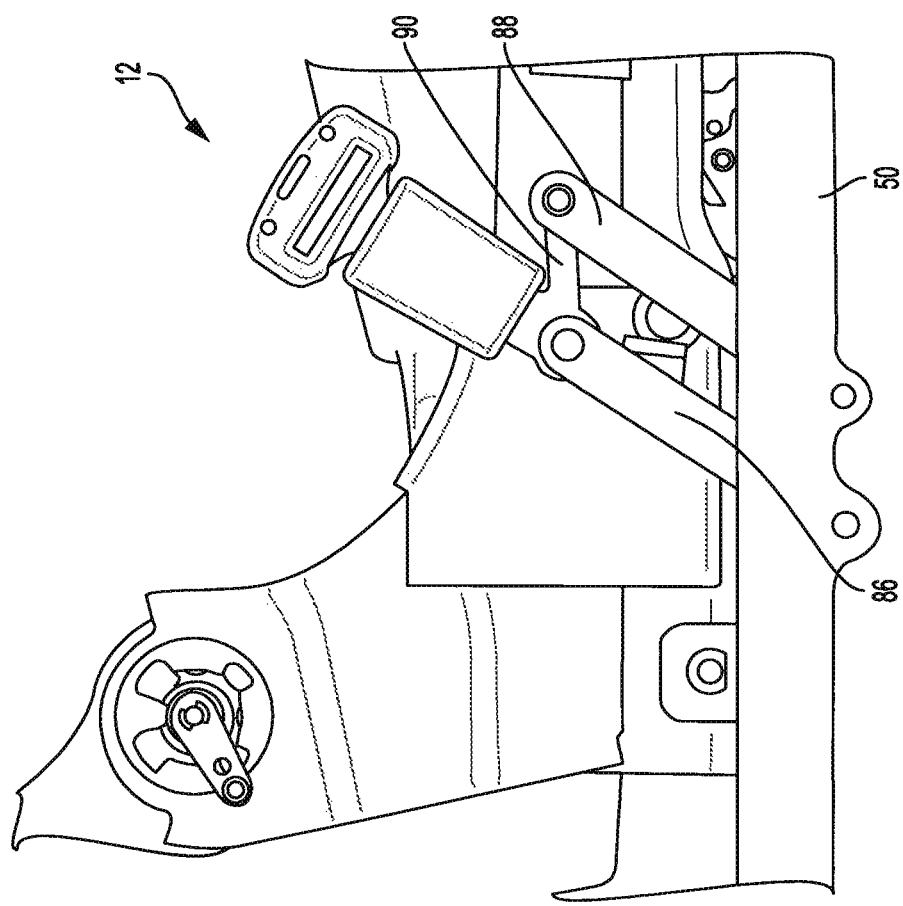
FIG. 6 is a side view of the vehicle seat shown in FIG. 1 in a third position in accordance with the principles of the present disclosure.

In the example illustration, vehicle seat 14 is designed as an adjustable 60% seat of a 60/40% split rear bench of the vehicle interior 10. As such, vehicle seat 14 is movable between a design position (FIG. 4) and a full forward position (FIG. 6). However, it will be appreciated that the adjustable occupant restraint system 36 may be utilized with various other seat applications or arrangements.

Figure 4:
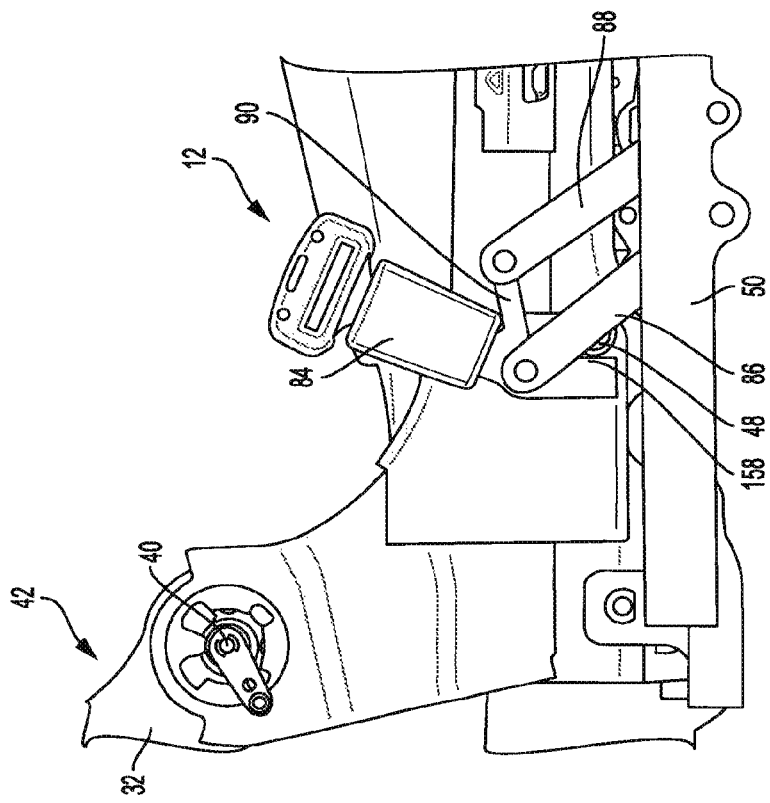
FIG. 4 is a side view of the vehicle seat shown in FIG. 1 in a first position in accordance with the principles of the present disclosure.

In the example embodiment, seat bottom 30 includes a distal or forward end (not shown) and a proximal or rearward end 38, which is rotatably coupled to seat back 32 at a pivot joint 40 (see FIG. 4). Seat back 32 generally includes a lower end 42 and an upper end (not shown). The trim cover 34 is coupled to the seat bottom 30 proximate the rearward end 38 and includes an inner surface 44 and an outer surface 46. Inner surface 44 is configured to be disposed against and/or face seat bottom 30, and outer surface 46 faces away from the seat bottom 30. An engagement tab 48 extends outwardly from outer surface 46 and is configured to selectively engage adjustable occupant restraint system 36, as described herein in more detail.

With continued reference to FIGS. 1-3, the adjustable occupant restraint system 36 will be described in more detail. In the illustrated embodiment, occupant restraint system 36 generally includes a floor bracket 50 coupled to a latch or buckle system 52 by a link system 54.

In the example embodiment, floor bracket 50 includes a main body portion 58 having a first or forward end 60, an opposite second or rearward end 62, and an intermediate section 64. As illustrated, main body 58 is generally rail-like and includes an inner surface 66, an outer surface 68, a first aperture 70, and a second aperture 72. Inner surface 66 generally faces toward seat bottom 30 and the trim cover outer surface 46.

First aperture 70 is configured to receive a fastener 74 (e.g., a bolt) for rotatably coupling a portion of link system 54 to the floor bracket 50. Second aperture 72 is configured to receive a fastener 75 (e.g., a bolt) for rotatably coupling another portion of link system 54 to the floor bracket 50. Main body portion 58 further includes a forward limit stop 76 configured to engage and limit movement of link system 54, as described herein in more detail. As shown in FIG. 2, forward limit stop 76 extends outward from inner surface 66 toward seat bottom 30.

As shown in FIG. 3, a forward anchor flange 78 is coupled to forward end 60 and includes one or more apertures 79 each configured to receive a fastener (not shown) to couple forward anchor flange 78 to the vehicle floor 18. A rearward anchor flange 80 is coupled to rearward end 62 and includes one or more apertures 81 each configured to receive a fastener (not shown) to couple rearward anchor flange 80 to the vehicle floor 18. When coupled to the vehicle floor 18, floor bracket 50 generally extends in a lateral direction of the vehicle extending between a front of the vehicle and a rear of the vehicle.

Buckle system 52 generally includes a tongue 82 configured to releasably couple to a buckle 84 that is secured to the link system 54. A seat belt (not shown) is configured to extend through tongue 82 and typically includes a first end secured to the vehicle seat 14 or floor 18 generally adjacent an occupant's hips. A second end may be operably coupled to a belt tensioner (not shown) configured to take up slack in the seat belt and to prevent slack during an acceleration or deceleration event, thereby restraining motion of the vehicle seat occupant.

Figure 5:
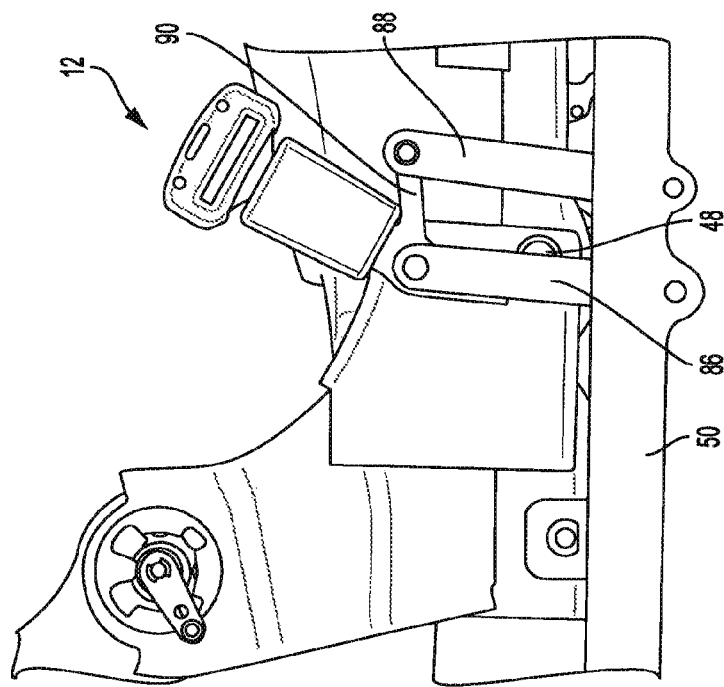
FIG. 5 is a side view of the vehicle seat shown in FIG. 1 in a second position in accordance with the principles of the present disclosure.

With further reference to FIGS. 4-6, in the example embodiment, link system 54 generally includes a main bar or link 86, a guide bar or link 88, and a buckle bracket 90. Link system 54 is configured rotatably couple buckle 84 to the floor bracket 50. This enables the buckle 84 to travel with the seat 14 as it moves through a range of seated positions. For example, FIG. 4 illustrates seat 14 in a rearmost design position, FIG. 5 illustrates seat 14 in an intermediate forward adjustment position, and FIG. 6 illustrates seat 14 in a full forward adjustment position. As such, the link system 54 is configured to maintain the buckle 84 pointed at a hip point of the seat occupant regardless of fare/aft adjustment of vehicle seat 14.

Main link 86 is generally bar-shaped and includes a first end 92, a second end 94, an outer surface 96, and an inner surface 98. First end 92 includes an aperture 102 configured to receive fastener 74 to rotatably couple main link 86 to floor bracket 50, and second end 94 includes an aperture 104 configured to receive a fastener 106 (e.g., a bolt) to rotatably couple main link 86 to buckle bracket 90. As shown in FIG. 2, main link outer surface 96 faces away from floor bracket 50, and main link inner surface 98 faces toward floor bracket 50.

Guide link 88 is generally bar-shaped and includes a first end 110, a second end 112, an outer surface 114, and an inner surface 116. First end 110 includes an aperture 118 configured to receive fastener 75 to rotatably couple guide link 88 to floor bracket 50, and second end 112 includes an aperture 120 configured to receive a fastener 122 (e.g., a bolt) to rotatably couple guide link 88 to buckle bracket 90. As shown in FIG. 2, guide link outer surface 114 faces away from floor bracket 50, and guide link inner surface 116 faces toward floor bracket 50. Further, guide link 88 includes a forward edge 124 configured to selectively engage forward limit stop 76, which prevents further forward movement of guide link 88 and link system 54 when the vehicle seat 14 has reached the full forward adjustment position (FIG. 6).

As best seen in FIGS. 2 and 3, buckle bracket 90 generally includes a central portion 130, a first tab or arm 132, a second tab or arm 134, and a third tab or arm 136. Central portion 130 includes an aperture 138 configured to receive fastener 106 to rotatably couple main link 86 to buckle bracket 90. Central portion 130 includes an outer surface 140 facing away from floor bracket 50, and an inner surface 142 facing toward floor bracket 50. First arm 132 extends outwardly from central portion 130 and is received by and/or coupled to buckle 84.

Second arm 134 extends outwardly from central portion 130 and includes a first end 144 and a second end 146. First end 144 is coupled to central portion 130, and second end 146 includes an aperture 148 configured to receive fastener 122 to rotatably couple guide link 88 to buckle bracket 90. Second arm 134 includes an outer surface 150 facing away from floor bracket 50, and an inner surface 152 facing toward floor bracket 50.

Third arm 136 extends outwardly from central portion 130 and includes a proximal end 154, a distal end 156, and an engagement flange 158. Proximal end 154 is coupled to central portion 130, and engagement flange 158 extends outwardly from an edge 160 of the third arm 136. Third arm 136 includes an outer surface 162 facing away from floor bracket 50, and an inner surface 164 facing toward floor bracket 50. In one example, engagement flange 158 is arranged perpendicular to or substantially perpendicular to the second tab 134.

As shown in FIG. 6, engagement flange 158 is configured to engage or contact engagement tab 48 of trim cover 34. A biasing mechanism 166 (FIG. 2) is configured to bias the main link 86 toward the front of the vehicle interior 10 so as to keep the engagement flange 158 engaged with the engagement tab 48 (see FIG. 6).

As such, biasing mechanism 166 maintains engagement flange 158 against tab 48 as the vehicle seat 14 is moved forward, thereby allowing restraint system 36 to rotate forward. At the same time, tab 48 acts to limit forward rotation therebeyond. In a similar manner, rearward movement of vehicle seat 14 causes tab 48 to engage flange 158 and rotate restraint system 36 rearward. Moreover, main link 86 and guide link 88 remain parallel to or substantially parallel to each other through the full range of movement, which increases system stability. In this way, occupant restraint system 36 is configured to rotate fore/aft as vehicle seat 14 is adjusted to thereby maintain buckle 84 in proper positioning at the hip point of the occupant.

In operation, seat 14 may begin in the design position shown in FIG. 4. In this position, biasing mechanism 166 biases engagement flange 158 against engagement tab 48, which prevent prevents further forward rotation of link system 54 to maintain buckle 84 substantially at the occupant hip point.

Forward movement of the seat 14 to the position shown in FIG. 5 effectively moves the engagement tab 48 forward within the vehicle interior 10. As such, due to the forward bias of biasing mechanism 166, buckle bracket 90 and thus link system 54 are rotated forward until engagement flange 158 is prevented from further movement by engagement tab 48. In this way, as seat 14 is slidably moved forward, link system 54 rotates forward to substantially maintain the buckle 84 at the occupant hip point.

Further forward movement of the seat 14 to the full forward position shown in FIG. 6 further moves the engagement tab 48 forward within the vehicle interior 10. Again, due to the forward bias of biasing mechanism 166, link system 54 is rotated forward until engagement flange 158 is prevented from further movement by engagement tab 48. Moreover, in this position, link system 54 is prevented from further forward rotation when guide link 88 engages forward limit stop 76 (also shown in FIG. 2). At this point, seat 14 may be folded forward to an easy entry position (not shown), while link system 54 restrained from further forward rotation by forward limit stop 76, to keep buckle 84 within reach of the seat occupant.

When returning the vehicle seat 14 to the design position (FIG. 3) in a rearward sliding motion, engagement tab 48 engages engagement flange 158 and overcomes the biasing force of biasing mechanism 166. This forces buckle bracket 90 and thus link system 54 to rotate rearward to substantially maintain the buckle 84 at the occupant hip point.

Described herein are systems and methods for an adjustable occupant restraint system for an adjustable vehicle seat. The occupant restraint system includes a four-bar linkage mounted to the floor. A seat belt buckle is coupled to the linkage, and the linkage rotates in response to and along with fore/aft movement of the vehicle seat to enable the buckle to travel with the vehicle seat through a range of seated positions. The rotational movement of the linkage is configured to maintain the buckle at the hip point of the seat occupant. Accordingly, the described system facilitates a buckle load path to the floor rather than the vehicle seat, and maintains the buckle in the proper position (e.g., ECE zone, at hip point) throughout the full fore/aft movement of the adjustable vehicle seat.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An adjustable occupant restraint system for a vehicle seat configured for fore/aft adjustment, the system comprising:
    a floor bracket configured to couple to a vehicle floor;
    a link system having a main link and a guide link each rotatably coupled to the floor bracket; and
    a seat belt buckle coupled to the link system,
    wherein the link system rotates in response to and along with the fore/aft adjustment of the vehicle seat to substantially maintain the seat belt buckle at a hip point of a seat occupant throughout the fore/aft adjustment of the vehicle seat.

2. The restraint system of claim 1, wherein the link system further comprises a buckle bracket rotatably coupled to the main link and the guide link.

3. The restraint system of claim 2, wherein the floor bracket and the link system form a four-bar linkage system where the floor bracket is stationary and the buckle bracket provides a movable buckle position relative to the floor bracket via the main link and the guide link.

4. The restraint system of claim 2, wherein the seat belt buckle is coupled to the buckle bracket.

5. The restraint system of claim 2, wherein the buckle bracket includes a central portion, and first, second, and third arms extending therefrom.

6. The restraint system of claim 5, wherein the seat belt buckle is coupled to the first arm, the second arm is rotatably coupled to the guide link, and the central portion is rotatably coupled to the main link.

7. The restraint system of claim 6, wherein the main link and the guide link are arranged substantially parallel to each other.

8. The restraint system of claim 6, wherein the third arm includes an engagement flange extending therefrom, the engagement flange configured to selectively engage an engagement tab projecting from the vehicle seat.

9. The restraint system of claim 8, further comprising a biasing mechanism operably associated with the main link and configured to rotate the main link in a forward direction such that engagement flange is biased into the engagement tab.

10. The restraint system of claim 9, wherein the main link is a first bar having a first end rotatably coupled to the floor bracket, and a second end rotatably coupled to the central portion, and wherein the guide link is a second bar having a first end rotatably coupled to the floor bracket, and a second end rotatably coupled to the second arm.

11. The restraint system of claim 1, wherein the floor bracket includes a forward limit stop configured to selectively engage the guide link and prevent further forward rotation of the link system.

12. A vehicle comprising:
    a floor;
    a seat slidably coupled to the floor and adjustable in fore/aft directions; and
    an adjustable occupant restraint system for the seat, the restraint system comprising:
        a floor bracket configured to couple to the floor;
        a link system having a main link and a guide link each rotatably coupled to the floor bracket; and
        a seat belt buckle coupled to the link system,
        wherein the link system rotates in response to and along with the fore/aft adjustment of the vehicle seat to substantially maintain the seat belt buckle at a hip point of a seat occupant throughout the fore/aft adjustment of the vehicle seat.

13. The vehicle of claim 12, wherein the vehicle seat is a 60% seat of a 60/40% rear seat split bench.

14. The vehicle of claim 12, wherein the link system further comprises a buckle bracket rotatably coupled to the main link and the guide link.

15. The vehicle of claim 14, wherein the floor bracket and the link system form a four-bar linkage system where the floor bracket is stationary and the buckle bracket provides a movable buckle position relative to the floor bracket via the main link and the guide link.

16. An adjustable occupant restraint system for a vehicle seat configured for fore/aft adjustment, the system comprising:
    a floor bracket configured to couple to a vehicle floor;
    a link system rotatably coupled to the floor bracket; and
    a seat belt buckle coupled to the link system,
    wherein the link system rotates in response to and along with the fore/aft adjustment of the vehicle seat to substantially maintain the seat belt buckle at a hip point of a seat occupant throughout the fore/aft adjustment of the vehicle seat,
    wherein the link system comprises a main link rotatably coupled to the floor bracket, a guide link rotatably coupled to the floor bracket, and a buckle bracket rotatably coupled to the main link and the guide link, and wherein the buckle bracket includes a central portion, and first, second, and third arms extending therefrom.

\* \* \* \* \*